United States Patent [19]

Yoshioka

[11] 4,366,994
[45] Jan. 4, 1983

[54] DAMPED BEARING DEVICE

[75] Inventor: Masahiro Yoshioka, Ibaraki, Japan

[73] Assignee: Hitachi, Ltd., Tokyo, Japan

[21] Appl. No.: 202,692

[22] Filed: Oct. 31, 1980

[30] Foreign Application Priority Data

Nov. 2, 1979 [JP] Japan ................................ 54-141326
Mar. 26, 1980 [JP] Japan ................................ 55-37457

[51] Int. Cl.³ ............................................. F16C 27/02
[52] U.S. Cl. ....................................... 308/26; 308/60; 308/62
[58] Field of Search ................. 308/26, 62, 72, 184 R, 308/184 A, 60, 59

[56] References Cited

U.S. PATENT DOCUMENTS

| | | | |
|---|---|---|---|
| 2,586,975 | 2/1952 | Messinger | 308/62 |
| 3,456,992 | 7/1969 | Kulina | 308/184 R |
| 4,027,931 | 6/1977 | Streifert | 308/28 |
| 4,214,796 | 7/1980 | Monzet et al. | 308/26 |

*Primary Examiner*—Lenard A. Footland
*Attorney, Agent, or Firm*—Antonelli, Terry and Wands

[57] ABSTRACT

A damped bearing device for damping the vibration acting on the bearing supporting a rotor shaft. The damped bearing device has an eccentricity adjusting ring by which an end of a bearing supporting spring assembly adapted to be fixed to the housing is fixed to the latter at an offset corresponding to the amount of deflection of the bearing supporting spring assembly.

4 Claims, 10 Drawing Figures

DAMPED BEARING DEVICE

BACKGROUND OF THE INVENTION

The present invention relates to a damped bearing device suitable for use in high-speed rotary machines and, more particularly, to a damped bearing device for use in high-speed rotary machines which undergo several critical speeds in the course of acceleration to the high running speeds.

It is a current tendency that rotary machines undergo several critical speeds when the machines are accelerated to the normal high running speed after the starting. When the rotary machine undergoes a critical speed, the amplitude of vibration thereof is increased to increase the force transmitted to the bearings to shorten the life of the bearing or to damage the same. In the worst case, the rotor of the machine itself becomes inoperative.

From view points of realization of high speed operation, as well as assurance of long life of the bearing, it is an important and effective measure to provide the bearing with a vibration damping means. An example of such a vibration damping means is disclosed in the specification of U.S. Pat. No. 3,456,992. This vibration damping means is constituted by a spring portion for resiliently supporting the bearing and a damper portion consisting of a squeeze film provided on the periphery of the bearing. If this known vibration damping means is used for a large-size machine of a heavy weight, the bearings are largely deflected downward by the weight of the rotor, because the latter is supported resiliently. In consequence, the vertical gap for the squeeze film in the damper portion becomes non uniform thereby deteriorating the damping effect of the damper portion. This in turn gives a rise to a demand for a structure for compensating for the deflection due to the weight of the rotor. Examples of such structures are shown, for example, in the specification of the U.S. Pat. No. 4,027,931 corresponding to German Pat. No. 2644026 and to Swiss Pat. No. 612,250.

In the damped bearing devices of the kind described, it is essential for sufficiently reducing the amplitude of vibration that the spring rigidity of the spring portion and the damping effect of the damper portion are isotropic with respect to the rotor, i.e., uniform in every radial direction of the rotor. In the conventional damped bearing devices, however, no specific consideration have been made for obtaining an isotropic of the spring rigidity and the damping effect. In addition, since the space in which the squeeze film of the damper portion acts is comparatively small, it requires an extremely delicate and minute work to maintain this space at the design value, taking into consideration the machining and assembling works.

SUMMARY OF THE INVENTION

It is, therefore, an object of the invention to provide a damped bearing device in which, for the damping of vibration, the spring rigidity and the damping of the damper portion are isotropic, i.e., uniform.

It is another object of the invention to provide a damped bearing device which is easy to set and adjust.

To these ends, according to the invention, there is provided a damped bearing device of a type having a bearing supporting spring assembly through which a bearing in support of the rotor shaft is supported on a housing, and a damper portion formed by a squeeze film between the outer periphery of the bearing and the housing, with the damper portion and the bearing supporting spring assembly cooperating with each other in damping the vibration of the bearings. In order to compensate for the lack of uniformity of the squeeze film of the damper portion attributable to the deflection of the bearing supporting spring assembly due to the weight of the rotor, biasing means are provided between the housing and a fixed portion of the bearing supporting spring assembly adapted to be fixed to the housing. The biasing means having a deflection corresponding to the deflection of the bearing supporting spring assembly and connect the fixed portion of the bearing supporting spring assembly to the housing in such a manner as to deflect the fixed portion in the opposite direction to the deflection of the bearing supporting spring assembly.

These and other objects, as well as advantageous features of the invention will become clear from the following description of the preferred embodiments taken in conjunction with the accompanying drawings.

DESCRIPTION OF THE PREFERRED EMBODIMENTS

Figure 1:
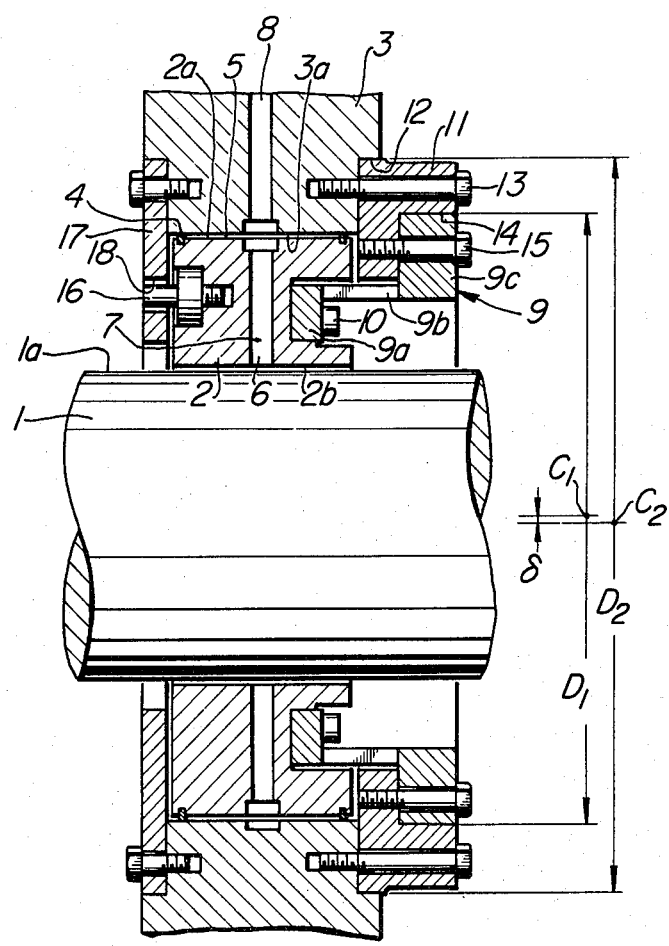
FIG. 1 is a sectional view of a damped bearing device constructed in accordance with a first embodiment of the invention, taken along the axis thereof.

Referring first to FIG. 1 showing a first embodiment of the invention, a rotor has a rotor shaft 1 supported by a bearing 2. The bearing 2 is placed between the outer peripheral surface 1a of the rotor shaft 1 and an inner peripheral surface 3a of a housing 3, and is allowed to move in the radial direction. Seals provided at both side portions of the outer peripheral surface 2a of the bearing 2 make contact with the inner peripheral surface 3a of the housing 3, so that a damper portion 5, in which a squeeze action takes place by the fluid film, is formed between the outer peripheral surface 2a of the bearing 2 and the inner peripheral surface 3a of the housing. An oil feed port 6 opens in the inner peripheral surface 2b of the bearing 2. This oil feed port 6 is communicated with the oil feed passage 7 provided in the bearing 2 and further with an oil feed passage 8 formed in the housing 3 through the damper portion 5. The bearing 2 is supported resiliently by a bearing supporting spring assembly generally designated by the reference numeral 9. This bearing supporting spring assembly 9 includes a flange 9a fixed to one side surface of the bearing 2 by bolts 10, a spring portion 9b and a flange 9c adapted to be fixed to the housing 3. The flange 9c of the bearing supporting spring assembly 9 is fixed to the housing 3 through the medium of a ring 11 which serves to position the flange 9c eccentric to the inner peripheral surface 3a of the housing 3. Hereafter, the ring 11 is referred to as an eccentricity adjusting ring.

To explain in more detail, the eccentricity adjusting ring 11 is fitted in a circular hole 12 formed in one side surface of the housing 3 and is fixed to the latter by means of bolts 13. The eccentricity adjusting ring 11 is provided in its outer side surface with a circular hole 14 for receiving the flange 9c of the bearing supporting spring assembly. The flange 9c received by this circular hole 14 is fixed by bolts 15 to the eccentricity adjusting ring 11.

The center $C_1$ of the hole 14 of the ring 11, having a diameter $D_1$, is offset upwardly by a distance $\delta$ from the center $C_2$ of the outer circle of the same ring 11 having a diameter $D_2$. The offset amount $\delta$ is designed to correspond to the deflection of the bearing supporting spring assembly due to the weight of the rotor. This amount of deflection can be determined by the relationship between the mass or weight of the rotor and the spring constant of the bearing supporting spring assembly 9.

A pin 16 is provided on the other side surface of the bearing 2 so as to extend in the axial direction. This pin 16 is received by a certain clearance by a pin-receiving bore 18 of the stop plate 17 provided on the other side surface of the housing 3. The pin 16 and the pin-receiving bore 18 cooperate with each other in preventing the excessive deflection of the bearing supporting spring assembly which would be for otherwise caused when the bearing 2 is deflected in the radial direction, to thereby prevent the breakdown of the bearing supporting spring assembly 9.

In the first embodiment of the invention having the described construction, the center of the bearing supporting spring assembly 9 is located at a position spaced upward from the center of the rotor receiving bore of the housing 3 by an offset amount $\delta$ which corresponds to the amount of deflection of the bearing supporting spring assembly 9. In consequence, the radial gap in the damper portion 5 is maintained uniformly in all directions. In addition, since only the fluid film making a squeeze action resides in the damper portion 5, the damping is made in an isotropic manner.

Figure 2:
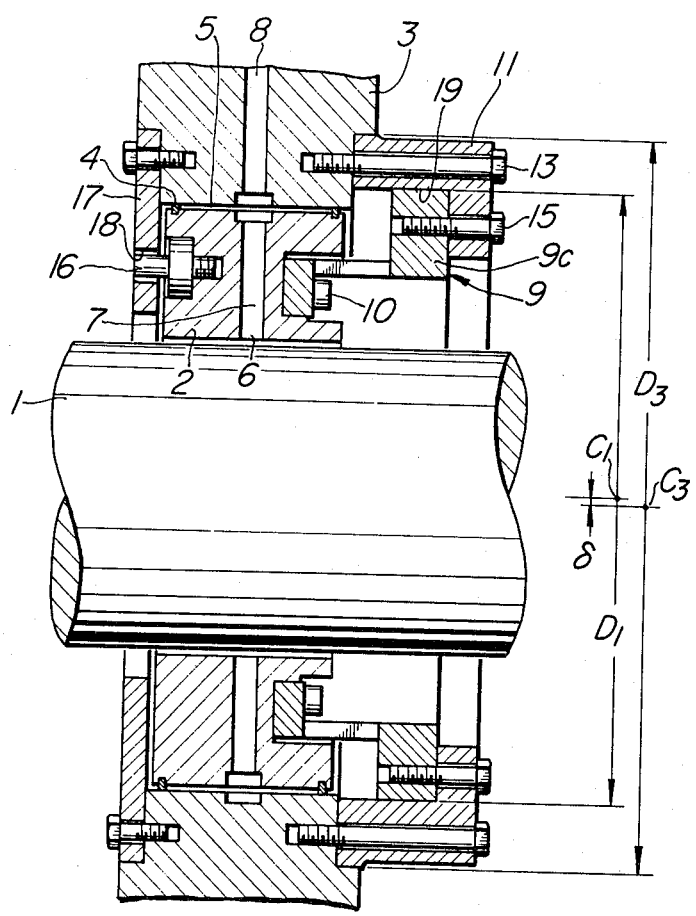
FIG. 2 is a sectional view of a damped bearing device constructed in accordance with a second embodiment of the invention taken along the axis thereof.

FIG. 2 shows a damped bearing device constructed in accordance with a second embodiment of the invention in which the same reference numerals are used to denote the same parts or members as those of the first embodiment shown in FIG. 1, and detailed explanation of these parts or members is omitted. In this second embodiment, the deflection of the bearing supporting assembly 9 due to the weight of the rotor is compensated for by an eccentricity adjusting ring 111 which can be exchanged at an improved efficiency. More specifically, the eccentricity adjusting ring 111 is provided at an inner side thereof with a circular hole 19 for receiving the flange 9c of the bearing supporting spring assembly 9. The flange 9c received by the hole 19 is fixed to the eccentricity adjusting ring 111 by means of bolts 15. The center $c_1$ of the hole 19, having a diameter $D_1$, is offset upward from the center $C_3$ of the outer circle of the ring 111 having a diameter $D_3$ by a distance $\delta$ also in this case.

According to this second embodiment, the deflection of the bearing supporting spring assembly 9 due to the weight of the rotor is materially negated or compensated for by the use of the eccentricity adjusting ring 111, and, accordingly, the thickness of the fluid film of the damper portion 5 is maintained substantially constant. When it becomes necessary to replace the eccentricity adjusting ring 111 with another ring for any reason such as change in the condition of use of the rotary machine, change of the weight of the rotor and so forth, it is possible to make such a replacement simply by withdrawing the bolts 13, 15, without necessitating the detaching of the bearing supporting spring assembly 9 and the bearing 2 from the housing 3.

Figure 3:
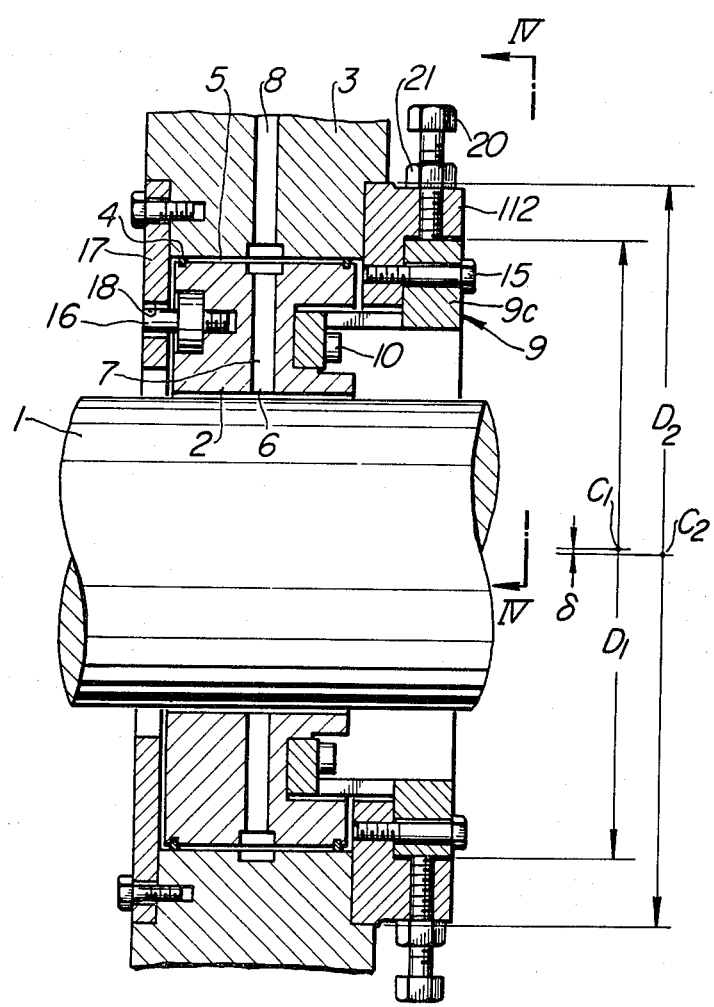
FIG. 3 is a sectional view of a damped bearing device constructed in accordance with a third embodiment of the invention taken along the axis thereof.
Figure 4:
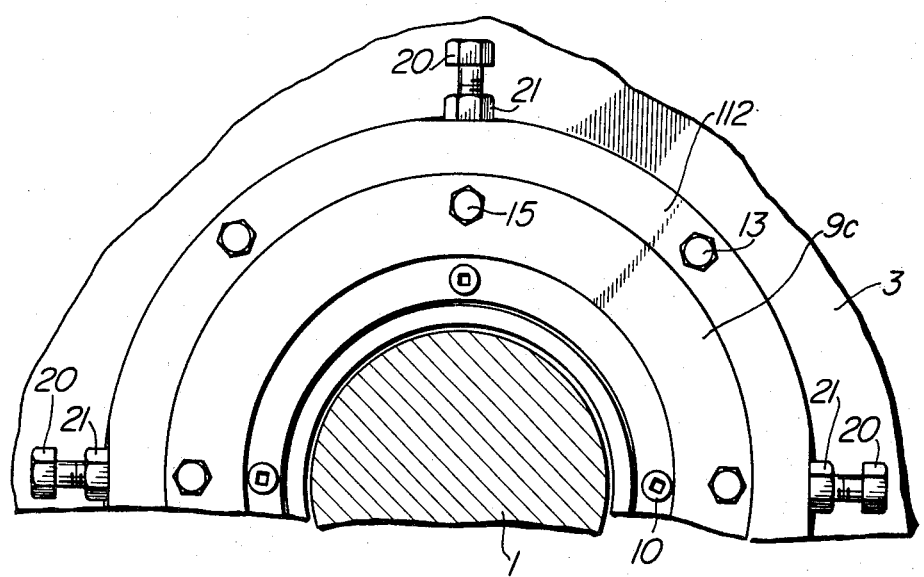
FIG. 4 is a sectional view of the damped bearing device of the third embodiment taken along the line IV—IV of FIG. 3.

FIGS. 3 and 4 show a third embodiment of the invention in which the same reference numerals are used to denote the same parts or members as those in the first embodiment shown in FIG. 1 and detailed description of such parts or members is omitted. In this third embodiment, in order to further make sure of the adjusting of the eccentricity in the first embodiment, the offset of the bearing supporting spring assembly 9 is made coarsely by means of an eccentricity adjusting ring 112. In addition, in order to eliminate the error of offset setting due to error of machining or the like, a fine adjustment of the bearing supporting spring assembly 9 is conducted by means of the bolts 20. The bolts 20 are screwed into the eccentricity adjusting ring 112 in the radial direction with respect to the axis of rotation and contacts at its end with the outer peripheral surface of the flange 9c of the bearing supporting spring assembly 9. This bolt is locked against loosening by means of a lock nut 21. The bolts 20 and the lock nuts 21 are provided around the eccentricity adjusting ring 112 at a distance. In the illustrated embodiment, there are provided four sets of the bolt 20 and nut 21 at the top and bottom, as well as at the right and left sides, of the eccentricity adjusting ring 112.

For adjusting the offset of the bearing supporting spring assembly 9 in this third embodiment, at first the bolts 15 are loosened to release the eccentricity adjusting ring 112 from the flange 9c of the bearing supporting spring assembly 9. In this state, the bolts 20 are suitably rotated to change their penetration depths, so that the bearing 2 together with the bearing supporting spring assembly 9 is displaced in the radial direction by a small distance. Thereafter, the bolts 15 are screwed again to fix the flange 9c to the eccentricity adjusting ring 112.

It is possible, by this adjustment, to eliminate the minute error of setting and, therefore, to maintain a uniform fluid film of the damper portion 5.

Figure 5:
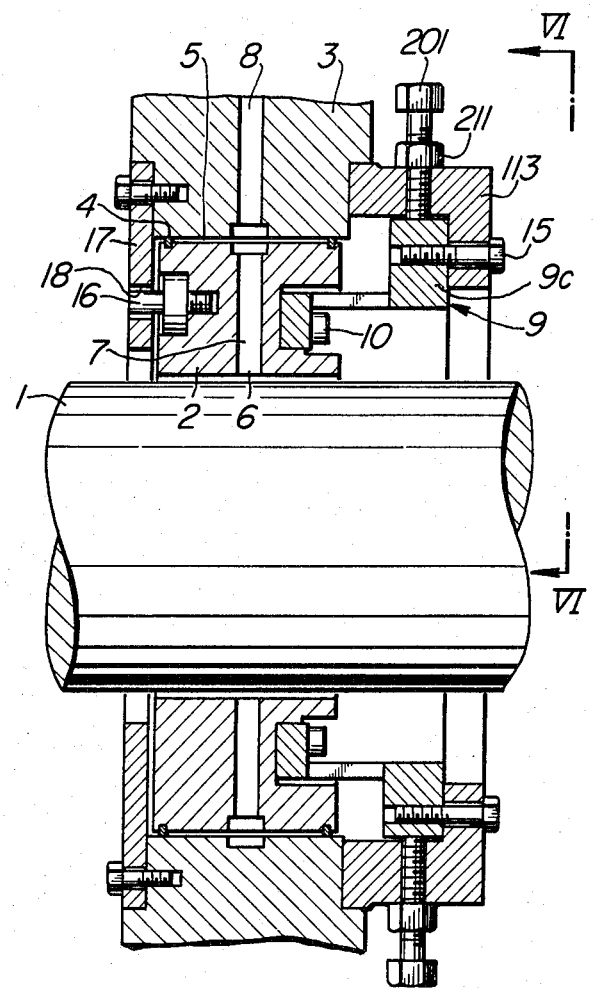
FIG. 5 is a sectional view of a damped bearing device constructed in accordance with a fourth embodiment of the invention taken along the axis thereof.
Figure 6:
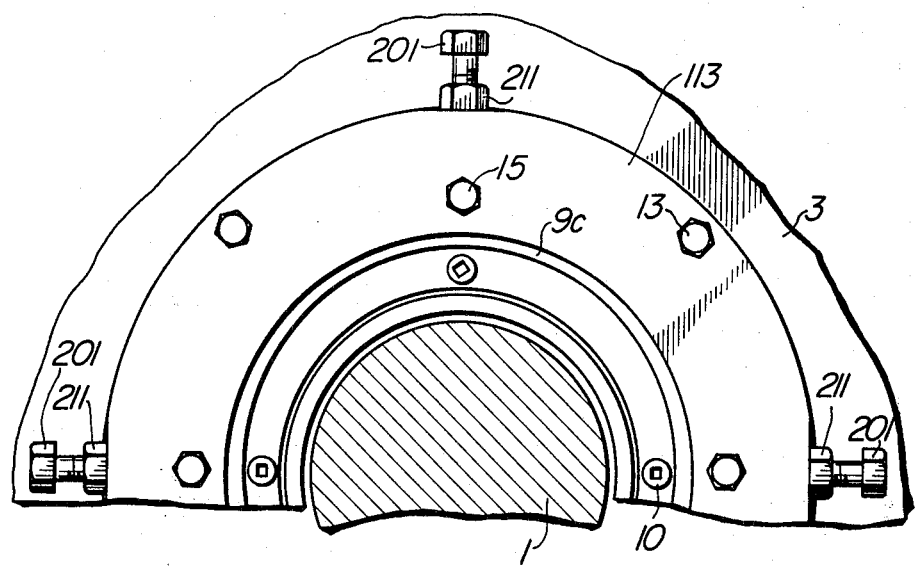
FIG. 6 is a sectional view of a damped bearing device of the fourth embodiment taken along the line VI—VI of FIG. 5.

FIGS. 5 and 6 illustrate a fourth embodiment of the invention in which the parts and members same as those of FIG. 2 are designated at the same reference numerals and are not described in detail. In this fourth embodiment, as in the case of the second embodiment, the offset adjustment in the second embodiment is further ensured by a coarse adjustment of the bearing supporting spring assembly 9 through an eccentricity adjusting ring 113 and a fine adjustment of the same which is effected by means of bolts 201 provided on the eccentricity adjusting ring 113. The bolt 201 is prevented from becoming loose, by a lock nut 211 engaging therewith.

According to this fourth embodiment, it is possible to make sure of the correct setting of offset of the bearing supporting spring assembly 9 and, hence, a uniform fluid film in the damper portion 5.

Figure 7:
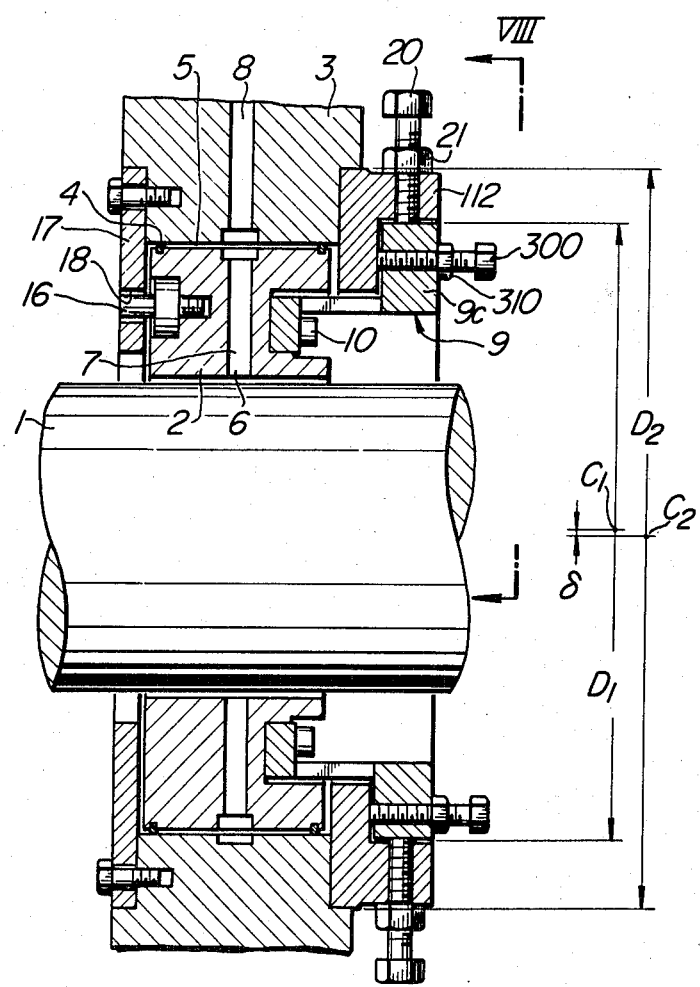
FIG. 7 is a sectional view of a damped bearing device constructed in accordance with a fifth embodiment of the invention taken along the axis thereof.
Figure 8:
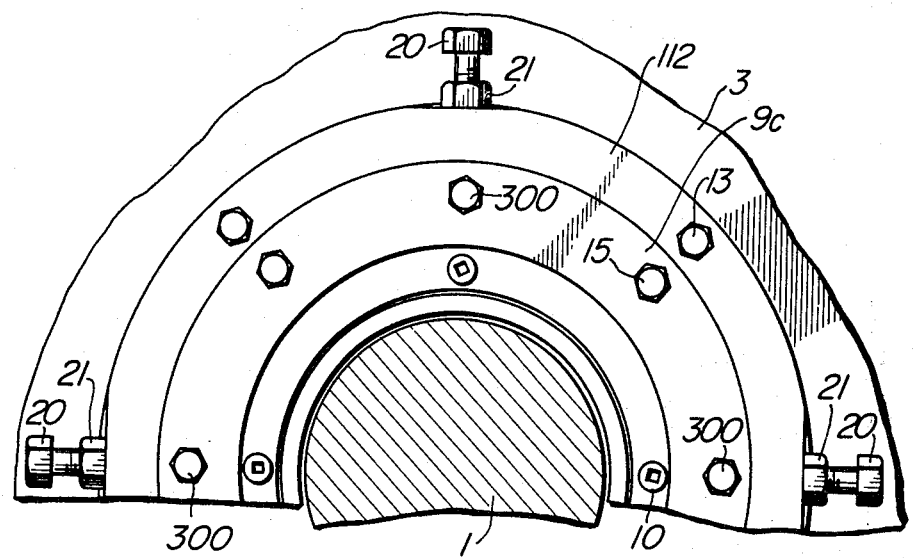
FIG. 8 is a sectional view of the fifth embodiment taken along the line VIII—VIII of FIG. 7.

FIGS. 7 and 8 show a fifth embodiment of the invention in which the same reference numerals are used to denote the same parts or members as those shown in FIGS. 1, 3 and 4 and detailed description of such parts or members is omitted. This fifth embodiment, in order to further make sure of the offset adjustment in the third embodiment shown in FIGS. 3 and 4, has a ring 112 for coarse adjustment of offset, bolts 20 for fine adjustment of the same, lock nuts 21 for locking these bolts, bolts 300 for finely displacing the bearing supporting spring assembly 9 in the axial direction and lock nuts 310 for locking these bolts.

According to this fifth embodiment, the bearing supporting spring assembly 9 can be adjusted in the radial direction by means of the eccentricity adjusting ring 112 and bolts 20 and, at the same time, the bearing 2 and the bearing supporting spring assembly 9 as a unit is adjusted finely in the direction parallel to the axis of rotation. By such adjustment, it is possible to maintain a uniform thickness of the fluid film in the damper portion 5, as well as the perpendicularity of the bearing 2 to the rotor shaft 1.

Figure 9:
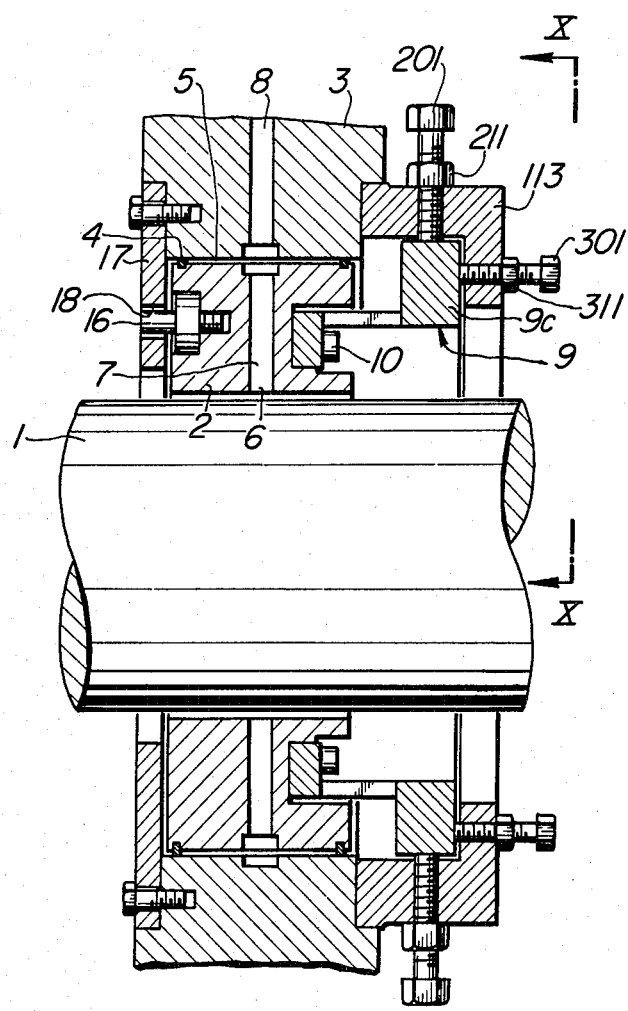
FIG. 9 is a sectional view of a damped bearing device constructed in accordance with a sixth embodiment of the invention.
Figure 10:
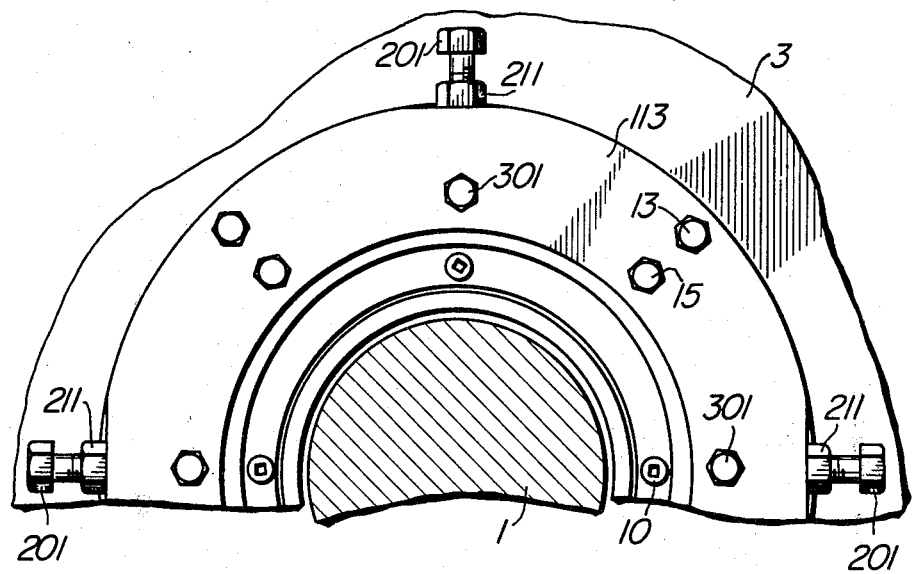
FIG. 10 is a sectional view of the sixth embodiment taken along the line IX—IX of FIG. 9.

FIGS. 9 and 10 show a sixth embodiment of the damped bearing device of the invention. In these Figures, the same reference numerals are used to denote the same parts or members as those in FIGS. 2, 5 and 6, and detailed description of these parts or members are omitted. This sixth embodiment has, in order to further make sure of the offset adjustment in the fourth embodiment shown in FIGS. 5 and 6, an eccentricity adjusting ring 113 for a coarse adjustment of the offset, bolts 201 for fine adjustment of the offset, lock nuts 211 for locking these bolts 201, bolts 301 for effecting fine axial adjustment of the bearing 2 and the bearing supporting spring assembly 9 and lock nuts 311 for locking these bolts 301.

According to this sixth embodiment, it is possible to preserve uniform thickness of the fluid film of the damper portion 5, and to maintain the perpendicularity of the bearing 2 to the rotor shaft 1, as in the case of the fifth embodiment.

As will be seen from the foregoing description, in the damped bearing of the invention, the bearing supporting spring assembly is mounted at a offset corresponding to the amount of deflection thereof by means of the eccentricity adjusting ring, so that a uniform fluid film thickness is ensured at the damper portion. In consequence, the damping at the damper portion is made in an isotropic manner to ensure an effective damping of the vibration amplitude.

What is claimed is:

1. In a damped bearing device wherein a bearing in support of a shaft of a rotor is suspended to a housing through a bearing supporting spring assembly, and a damper portion including a squeeze film is formed between the outer periphery of the bearing and the housing, said damper portion and said bearing supporting spring assembly cooperating with each other in damping vibration of the bearing, the improvement comprising a biasing means having a biasing member disposed at a connection between said housing and a fixed portion of said bearing supporting spring assembly adapted to be fixed to said housing, said biasing member having an offset corresponding to an amount of deflection of said bearing supporting assembly due to weight of the rotor including said rotor shaft, said biasing member connecting the fixed portion of said bearing supporting spring assembly to said housing at said offset in an opposite direction to the deflection of said bearing supporting spring assembly, to thereby compensate for a loss of uniformity of said squeeze film in said damper portion.

2. In a damped bearing device wherein a bearing in support of a shaft of a rotor is suspended to a housing through a bearing supporting spring assembly, and a damper portion including a squeeze film is formed between the outer periphery of the bearing and the housing, said damper portion and said bearing supporting spring assembly cooperating with each other in damping vibration of the bearing, the improvement comprising a biasing means disposed at a connection between said housing and a fixed portion of said bearing supporting spring assembly adapted to be fixed to said housing, said biasing means having an offset corresponding an amount of deflection of said bearing support assembly due to weight of the rotor including said rotor shaft, said biasing member connecting the fixed portion of said bearing supporting spring assembly to said housing as said offset in an opposite direction to the deflection of said bearing supporting spring assembly, to thereby compensate for a loss of uniformity of said squeeze film in said damper portion, said biasing means include an eccentricity adjusting ring having an offset corresponding to the amount of deflection of said bearing supporting spring assembly due to the weight of said rotor, said ring connecting said fixed portion of said bearing supporting spring assembly to said housing at said offset in an opposite direction to said deflection of said bearing supporting spring assembly.

3. In a damped bearing device wherein a bearing in support of a shaft of a rotor is suspended to a housing through a bearing supporting spring assembly, and a damper portion including a squeeze film is formed between the outer periphery of the bearing and the housing, said damper portion and said bearing supporting spring assembly cooperating with each other in damping vibration of the bearing, the improvement comprising a biasing means disposed at a connection between said housing and a fixed portion of said bearing supporting spring assembly adapted to be fixed to said housing, said biasing means having an offset corresponding to an amount of deflection of said bearing supporting assembly due to the weight of the rotor including said rotor shaft, said biasing means connecting the fixed portion of said bearing supporting spring assembly to said housing at said offset in an opposite direction to the deflection of said bearing supporting spring assembly, to thereby compensate for a loss of uniformity of said squeeze film in said damper portions, said biasing means includes an eccentricity adjusting ring adapted to coarsley adjust said fixed portion of said bearing supporting spring assembly at such an offset corresponding to the amount of deflection of said bearing supporting spring assembly in the opposite direction to said deflection and a fine eccentricity adjusting means secured to said eccentricity adjusting ring and adapted for a fine adjustment of said bearing supporting spring assembly in a radial direction.

4. In a damped bearing device wherein a bearing in support of a shaft of a rotor is suspended to a housing through a bearing supporting spring assembly, and a damper portion including a squeeze film is formed between the outer periphery of the bearing and the housing, said damper portion and said bearing supporting spring assembly cooperating with each other in damping vibration of the bearing, the improvement comprising a biasing means disposed at a connection between said housing and a fixed portion of said bearing supporting spring assembly adapted to be fixed to said housing, said biasing means having an offset corresponding to an amount of deflection of said bearing supporting assembly due to weight of the rotor including said rotor shaft, said biasing means connecting the fixed portion of said bearing supporting spring assembly to said housing at said offset in an opposite direction to the deflection of said bearing supporting spring assembly, to thereby compensate for a loss of uniformity of said squeeze film in said damper portion, said biasing means including an eccentricity adjusting ring adapted to coarsely locate said fixed portion of said bearing supporting spring assembly at an offset corresponding to the amount of deflection of said bearing supporting spring assembly in the opposite direction to said deflection, a radial fine adjusting means secured to said eccentricity adjusting ring and adapted for a fine adjustment of said bearing supporting spring assembly in the radial direction, and an axial fine adjusting means for a fine adjustment of said bearing supporting spring assembly in the axial direction in relation to said eccentricity adjusting ring.

* * * * *